United States Patent [19]

Spangenberg

[11] Patent Number: 4,958,421

[45] Date of Patent: Sep. 25, 1990

[54] METHOD FOR ASSEMBLING A VENETIAN BLIND

[75] Inventor: Robbert E. Spangenberg, Oosterhout, Netherlands

[73] Assignee: Hunter Douglas International N.V., Curacao, Netherlands Antilles

[21] Appl. No.: 274,519

[22] Filed: Nov. 22, 1988

[30] Foreign Application Priority Data

Dec. 2, 1987 [NL] Netherlands .......................... 8702890

[51] Int. Cl.$^5$ .......................................... B23P 19/04

[52] U.S. Cl. .................................. 29/24.5; 160/178.3

[58] Field of Search ...................... 29/24.5; 160/178.3, 160/178.1

[56] References Cited

U.S. PATENT DOCUMENTS

| | | | |
|---|---|---|---|
| 3,824,657 | 7/1974 | Nilsson | 29/24.5 |
| 4,188,693 | 2/1980 | Edixhoven | 29/24.5 |
| 4,514,886 | 5/1985 | Edixhoven | 29/24.5 |
| 4,543,699 | 10/1985 | Anderson | 29/24.5 |

*Primary Examiner*—Howard N. Goldberg
*Assistant Examiner*—Irene Cuda
*Attorney, Agent, or Firm*—Pennie & Edmonds

[57] ABSTRACT

Venetian blind ladder means are provided in which first and second cross elements (4,5) of each cross connections of the ladder are located whereby the height of the projection of every pair of elements on a plane through the longitudinal side member axes ranges between zero and slightly larger than the depth of the blind slat material and the distance between the side members (*3a,3b*) of the ladder is only slightly greater than the slat width. During assembly, the ladder means are guided so that, at the location of interlacing, each consecutive interlacing opening is angled to extend in a plane perpendicular to the plane of slat feed or at an angle so that the projection of the mutual spacing between elements (4,5) in this perpendicular plant is sufficiently large to allow the advancing slat to be easily and rapidly fed therethrough.

5 Claims, 2 Drawing Sheets

METHOD FOR ASSEMBLING A VENETIAN BLIND

This invention relates in general to venetian blinds, and in particular to a ladder means therefore and a method and apparatus for assembly.

In slatted blinds for general purposes the ladder means are made up of two longitudinal side members with cross connections between them. Slatted blind slats are fitted here either on the cross connections, i.e. in between the successive cross connections, or if the cross connection for this purpose is specially made up of several elements, between the elements of a cross connection.

The latter option is applied particularly if the position of the slat relative to the cross connection has to meet very high standards, or if the blind is in such a position that it is difficult to reach for adjustment of any slat positions relative to the cross connections, e.g. for blinds between glass, such as blinds within sealed double or multiple glassed windows. Such a design is also necessary for sloping roof window structures or horizontal applications of the blinds.

In addition, the assembly of the blind, including the fitting of the slats in the ladder means is increasingly being carried out by machine. It has now been found that with the introduction of blinds with very narrow slats, i.e. slats which are less than 25 mm wide, for example 12 mm or 16 mm or 18 mm, which often means that the slat material itself is also of reduced thickness, problems are encountered, both during manual and during automatic fitting of the slats between the elements of the cross connections. With automatic interlacing it leads to a considerable reduction in the allowable slat feed speed.

This is due to the fact that the dimensions of slat and ladder are smaller, and also because the play tolerances are also proportionately smaller with such small dimensions.

According to the present invention there is provided a method of assembling a venetian blind including interlacing of slat material of a given width and depth between cross elements of a cross connection of a venetian blind ladder means, said method comprising the steps of:

(a) providing at least two ladder means, each comprising a pair of spaced parallel longitudinally extending side members, and a plurality of longitudinally spaced cross connections, one cross connection being provided for each slat of the venetian blind, each cross connection including at least a first and a second cross element at least laterally spaced so that together with said mutually spaced side members an opening is defined that could easily accommodate the cross-section of the slat material with the given width and depth;

(b) providing venetian blind slat material of said given width and said given depth;

(c) at least at the location of the interlacing intermittently moving the ladder means stepwise and in a stretched condition to position consecutive cross connections at the location of interlacing, (d) positioning the first and second cross element of the relevant cross connection so that the slat material could be fed between said first and second cross element;

(e) feeding the venetian blind slat material through the thus formed interlacing opening between said first and second cross element; and (f) guiding the ladder means side members so that, at least at the location where the slat material is fed into an interlacing opening, the side members of each ladder means are each positioned at an acute angle to the relevant longitudinal side edge of the advancing slat whereby, during each interlacing step, each consecutive interlacing opening extends in a plane which is perpendicular to the plane of slat feed, or at an acute angle thereto, whereby the projection of the mutual spacing between the first and second elements on a plane perpendicular to the plane of slat feed is sufficiently large to allow the advancing slat to be easily and rapidly fed into and through the interlacing opening, said angle being a function of the distance between and position of said first and second elements Such a method allows relatively rapid interlacing of the slats into the ladder means, because at the moment of interlacing the opening presented for the slats is adequately large and can even be more than adequately large for interlacing purposes. After interlacing the slats are enclosed by said elements with only very slight or no tolerance or even under tension from the cross elements.

The plane through a side member of the ladder means and a relevant extension of the side edge of a slat forms an acute angle with the plane of slat feed. This angle is preferably between 40° and 80°. This can be additionally beneficial, because it means that the horizontal distance between the elements of the cross connection, and if present, the distance in the vertical direction between those elements is within a particularly favourable range.

In the assembled state the slat can still be completely enclosed by the first and second elements, but with the use of the method according to the invention, if one of the larger angles in the minimum angle range is selected, an optimum infeed aperture is still possible. Preferably the length of the first and second elements of a cross connection is no more than 105% of the width of the fitted slat. As a result, the play for lateral displacement of the slat is extremely small, which is important for closing of the slatted blinds. This means that known assembling methods spreading the cross elements with mechanical means entering between the elements are totally unsuitable. Advantageously, therefore, with slats with really small widths it is advantageous at the location where the slat is fed into the interlacing opening, that the line of intersection of the slat feed plane and the plane through the first and second cross elements be perpendicular to the longitudinal axis of the slat feed.

The invention further provides ladder means for supporting slats of a given width and a given depth, said ladder means comprising a pair of spaced parallel longitudinally extending side members and a plurality of longitudinally spaced cross connections, one cross connection being provided for each slat of a venetian blind, each cross connection including at least a first and a second laterally spaced cross element, the mutual spacing between the cross elements, as measured in the plane joining the cross elements of any given cross connection, being greater than said given depth of the slat, wherein the height of the projection of every pair of first and second cross elements on a plane through the longitudinal side member axes ranges between zero and slightly larger than the given depth of the slats and the distance between the side members of the ladder means is only slightly greater than said given width of the slats.

Preferably the height of said projection is smaller than the given depth of the slat. Advantageously the cross elements of a given cross connection include a first cross element on one side of the ladder means, and a second cross element on the other side of the ladder means, the first cross element being both laterally and vertically spaced from the second cross element, the first cross element of each of the cross connections being higher than the second cross element of the respective cross connections.

According to another aspect of the invention there is provided an assembling machine for assembling the slats of a venetian blind of a given width and of a given depth, said machine comprising guide means for guiding the side members of the ladder means of the venetian blind at or near the location of the interlacing, means for feeding a ladder means, said ladder means comprising a pair of spaced parallel longitudinally extending side members, and a plurality of longitudinally spaced cross connections, one cross connection being provided for each slat of the venetian blind, each cross connection including at least a first and a second laterally spaced cross element, the mutual spacing between cross elements, as measured in a plane through the cross elements of any given cross connection being slightly greater than said given depth of the slats, and the distance between said side members being only slightly greater than the given width, means for feeding venetian blind slat material between said first and second elements and along a given plane, wherein said guide means are positioned to have an axis of the side members at the location of interlacing which is at an angle less than 90° with respect to the plane of the slat feed.

According to the invention a maximum insertion passage can be achieved for interlacing at a selected size of the angle at which the ladder means is placed by means of its longitudinal members relative to the slat insertion device.

The method described, and thus the ladder means according to the invention, can be used with various existing assembly machines which ensure the automatic supply and feeding through of slats and stepwise conveyance of the various ladder members during the assembly, as it gives the principle advantage of more than normal interlacing space for slats of any width and depth. The method in fact involves tilting of the position of the first and second elements of the cross connection, so that an ample passage for the slat is obtained on a temporary basis.

Once this tilted position is cancelled the slat is confined between the first and second elements. This does away with the hitherto existing situation, in which the elements of the cross connection had to be placed in the lengthwise direction of the carrier ladder at such a distance from each other that a good slat throughfeed was ensured, but where this spacing and the play relative to the slat which it involved remained, even in the assembled state of the blind. This meant that the position of the slat relative to the ladder member could be upset, with the result that deviations in the tilted position of the various slats and defects in the proper closure of the blind could arise. These problems have been alleviated by the invention, in particular where the blind is difficult or impossible to reach. There is a clear relationship between the horizontal distance and if present, the vertical distance between the cross elements and the required side member guiding angle. Within this relationship the distances and angles can be chosen to give the best results in method and/or machine and/or ladder means based on the specific requirements and circumstances.

In order that the invention may more readily be understood, the following description is given, merely by way of example, reference being made to the accompanying drawings, in which.

Figure 1:
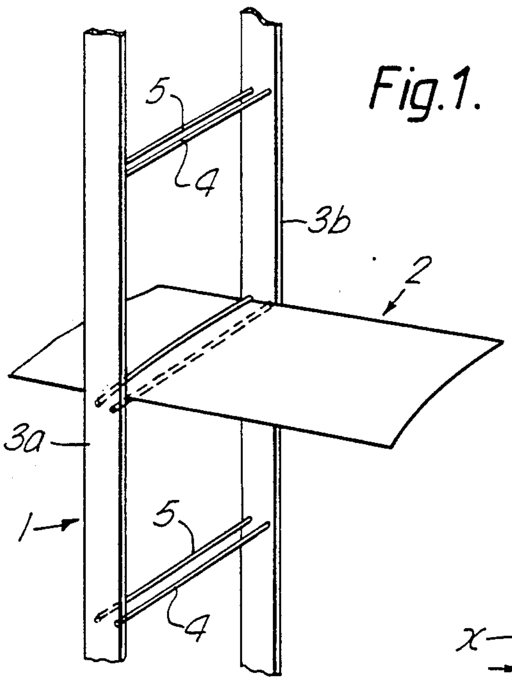
FIG. 1 is a perspective view of one embodiment of the ladder means and slat according to the invention with an associated slat.
Figure 2:
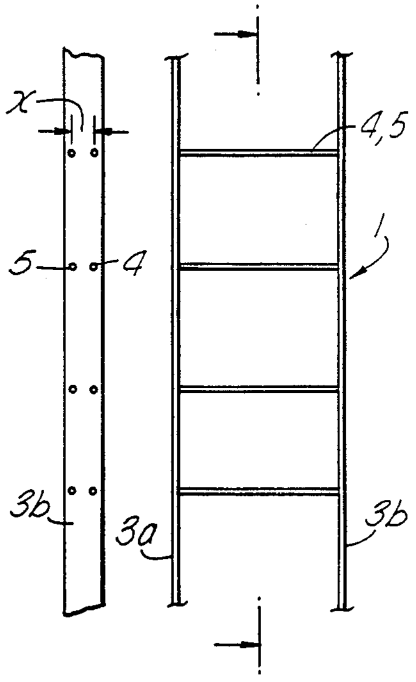
FIG. 2 shows this carrier means in front and side elevation.
Figure 3:
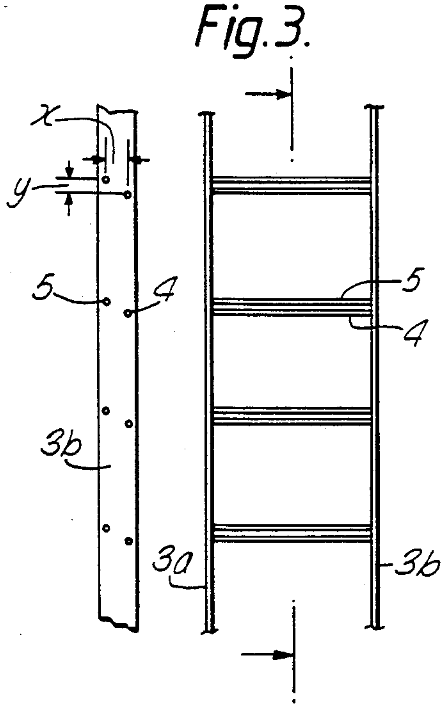
FIG. 3 shows a further embodiment of the ladder means according to the invention in front and side elevation.

FIG. 1 shows a knitted carrier ladder structure 1 with spaced longitudinal side members **3*a* and 3*b*, between which cross connections extend, each having first elements 4 and second elements 5. The slat 2 is shown in the fitted state here. FIGS. 2 and 3 show two embodiments of the carrier ladder according to the invention, which in a vertical arrangement of the carrier ladder in FIG. 2 the two elements 4 and 5 of the cross connections are situated next to each other with a mutual spacing x between them, while in the embodiment of FIG. 3 in the same position of the carrier ladder the first and second elements 4 and 5** also have a height difference y between them.

The distance x is preferably so chosen that in applying the method to be described below, if the plane passing through the longitudinal axes of the two side members is inclined at an angle within the range 30°–90° and preferably between 40°–80° to the plane including the longitudinal side edges of a slat to be fed into the interlacing opening defined between the first and second elements, the size of the interlacing opening itself or the projection of the interlacing opening on a plane perpendicular to the feed direction will always be sufficient to allow a slat to be fed easily and quickly into the interlacing opening.

With the embodiment of either FIG. 2 or FIG. 3, it will be clear that when the ladder, as viewed from the side, is brought to an inclined position with the bottom to the left and the top to the right, with the same angle used for both embodiments, a certain size of the projection of the interlacing opening on a plane perpendicular to the feed direction will be produced. The larger the angle of inclination, up to a certain value, the larger the interlacing opening produced will be. With regard to FIG. 3, this can only be achieved if, as shown, the first elements 4 are all below the second elements 5.

Figure 4:
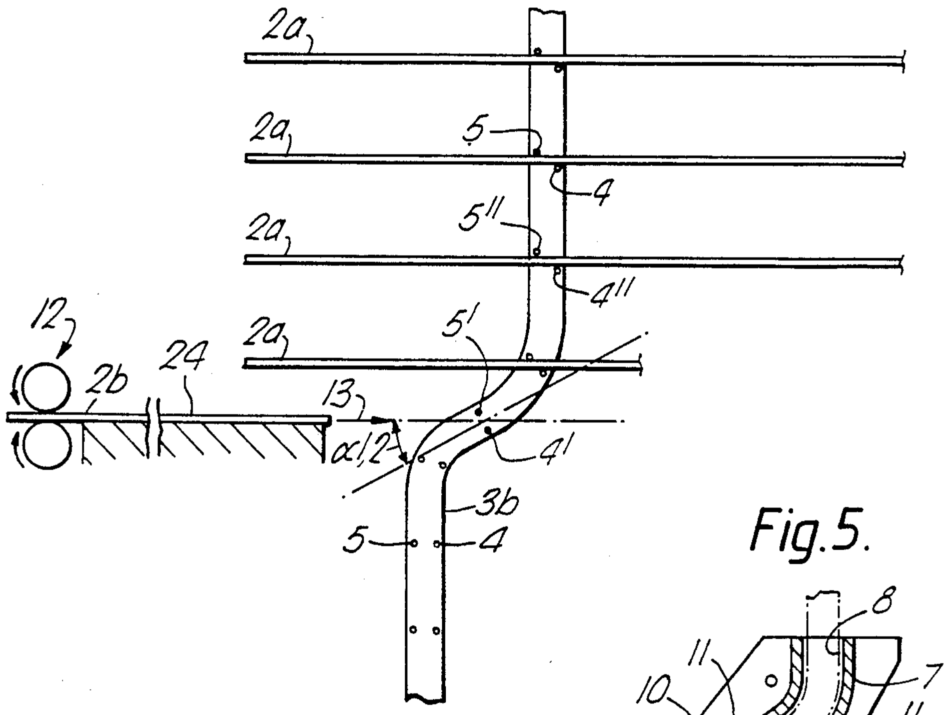
FIG. 4 shows schematically the principle of the method according to the invention.
Figure 5:
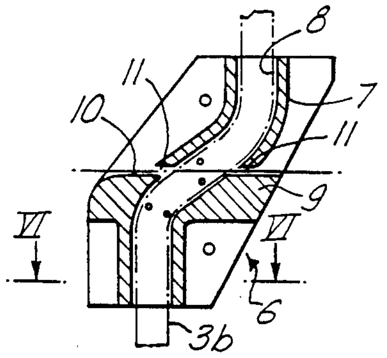
FIG. 5 is a side elevation of the guide portion of the one embodiment of apparatus of the invention, partly in section taken along the line V—V of FIG. 6.
Figure 6:
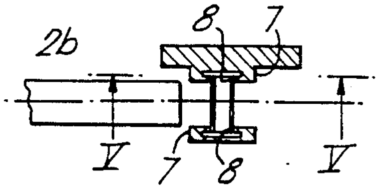
FIG. 6 is a section taken along the line VI—VI of FIG. 5.

As shown in FIG. 4, the slats **2*a* are already interlaced. The slat 2*b* is shown being fed by feed means illustrated schematically at 12 along a feed direction 13. At the point of insertion between the elements 4 and 5 of the cross connection, the carrier ladder is guided so that the longitudinal side members 3*a*, 3*b* form angles $\alpha 1$ and $\alpha 2$, respectively, with the feed direction. Angles $\alpha 1$ and $\alpha 2$ may be equal or different in size. In this way the elements in position 4' and 5' are positioned, as viewed, looking in the feed direction, at a distance from each other, and the slat can be inserted between the two. With further guidance, the elements 4 and 5 tilt back again, and the slat is completely enclosed, preferably even slightly clamped by the elements in position 4' and 5'**.

A guide 6 can be fixed to a machine frame of an ordinary venetian blind assembly machine and has guide members 7 with slots 8 for the longitudinal side members 3a, 3b of the ladder.

The two guide members 7 can be connected by means of a bridge piece 9. This bridge piece can also form a further feed guide 10 for the slat 2b as it is fed in.

The guide slot walls can be interrupted locally at 11, in order to be able to insert the slat over virtually the full length of the cross connection elements.

For the method according to the invention it is however, conceivable to use any other suitable mechanism including those whereby the ladder means are guided and tensioned, both below and above the relevant cross member so that the cross member and the interlacing opening are completely free and unobstructed.

As stated, the method can be used for most existing slatted blind assembly methods and machines whether or not specifically suitable for the assembling of very narrow and/or thin slats while retaining or even improving the assembling speed although conceived in particular for the latter slat type. Examples of such existing method and machines are described in U.S. Pat. Nos. 4,188,693 and 4,514,886.

I claim:

1. A method for interlacing a plurality of slats with a plurality of ladder means to form a venetian blind, each slat having a given width and a given depth, defining a cross section, the ladder means comprising a pair of horizontally spaced, parallel, longitudinally extending side members, the side members being in the form of tapes, and a plurality of longitudinally spaced cross connections, one cross connection being provided for each slat, each cross connection including at least a first and a second cross element, the first cross element being spaced from the second cross element along the width of the tape side members, the mutual spacing between the cross elements of any given cross connection, as measured in the plane joining the longitudinal axes of the cross elements, being greater than the given depth of a slat, wherein the height of the projection of every pair of first and second cross elements on a plane through the longitudinal axes of the side members ranges between zero and slightly greater than the given depth of the slats and the distance between the side members of the ladder means is slightly greater than the given width of the slats, the interlacing of each slat comprising the steps of:

(a) supplying a slat along a feed path perpendicular to the cross section of the slat;

(b) providing at least two said ladder means, wherein the mutual spacing between the cross elements of each ladder means defines an interlacing opening;

(c) intermittently moving the side members longitudinally and stepwise in a laterally stretched condition to sequentially position consecutive cross connections at a location of interlacing, at which the slat enters the interlacing opening;

(d) guiding the side members so that, at least at the interlacing location, the side members of each ladder means are each positioned so that the longitudinal axis of each side member forms an acute angle with the longitudinal axis of the feed path, such that the projection of the interlacing opening on a plane perpendicular to the longitudinal axis of the feed path is larger than the cross section of the slat; and (e) feeding the slat through the interlacing opening.

2. A method according to claim 1, wherein a plane through the longitudinal axis of a side member and a line parallel to a longitudinal side edge of the slat form an acute angle with a plane through the longitudinal side edges of the slat.

3. A method according to claim 2, wherein at the location of interlacing, the line of intersection of a plane including the longitudinal side edges of the slat and a plane through longitudinal axes of the first and second cross elements is perpendicular to the longitudinal axis of the slat feed.

4. A method according to claim 7, wherein said acute angle between each side member at the location of interlacing and the relevant extension of the longitudinal side edges of the slat is between 40° and 80°.

5. The method according to claim 1, wherein the first cross element is spaced from the second cross element along the width and along the length of the tape side members.

* * * * *

UNITED STATES PATENT AND TRADEMARK OFFICE
CERTIFICATE OF CORRECTION

PATENT NO. : 4,958,421

DATED : September 25, 1990

INVENTOR(S) : Robbert E. Spangenberg

It is certified that error appears in the above-identified patent and that said Letters Patent is hereby corrected as shown below:

At column 6, line 41, please delete "7", and insert therefor --1--.

Signed and Sealed this

Twenty-fourth Day of December, 1991

*Attest:*

HARRY F. MANBECK, JR.

*Attesting Officer*

*Commissioner of Patents and Trademarks*